S. G. GILLELAND.
BALING PRESS.
APPLICATION FILED AUG. 5, 1909.
968,650.
Patented Aug. 30, 1910.
4 SHEETS—SHEET 1.
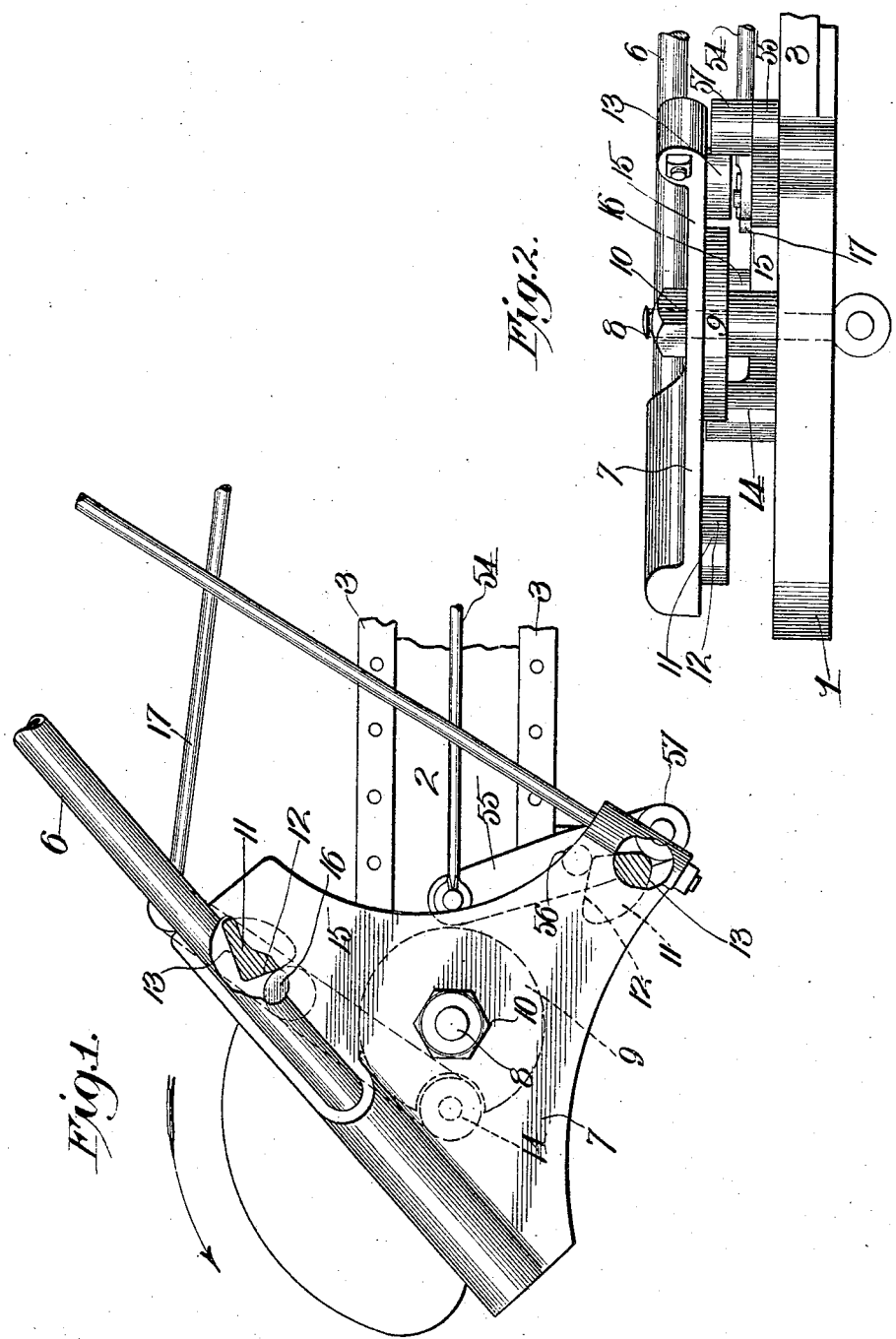
Witnesses
Frank R. Hon
H. C. Rodgers
Inventor
S. G. Gilleland
By George H. Thorpe Atty.

S. G. GILLELAND.
BALING PRESS.
APPLICATION FILED AUG. 5, 1909.
968,650.
Patented Aug. 30, 1910.
4 SHEETS—SHEET 2.
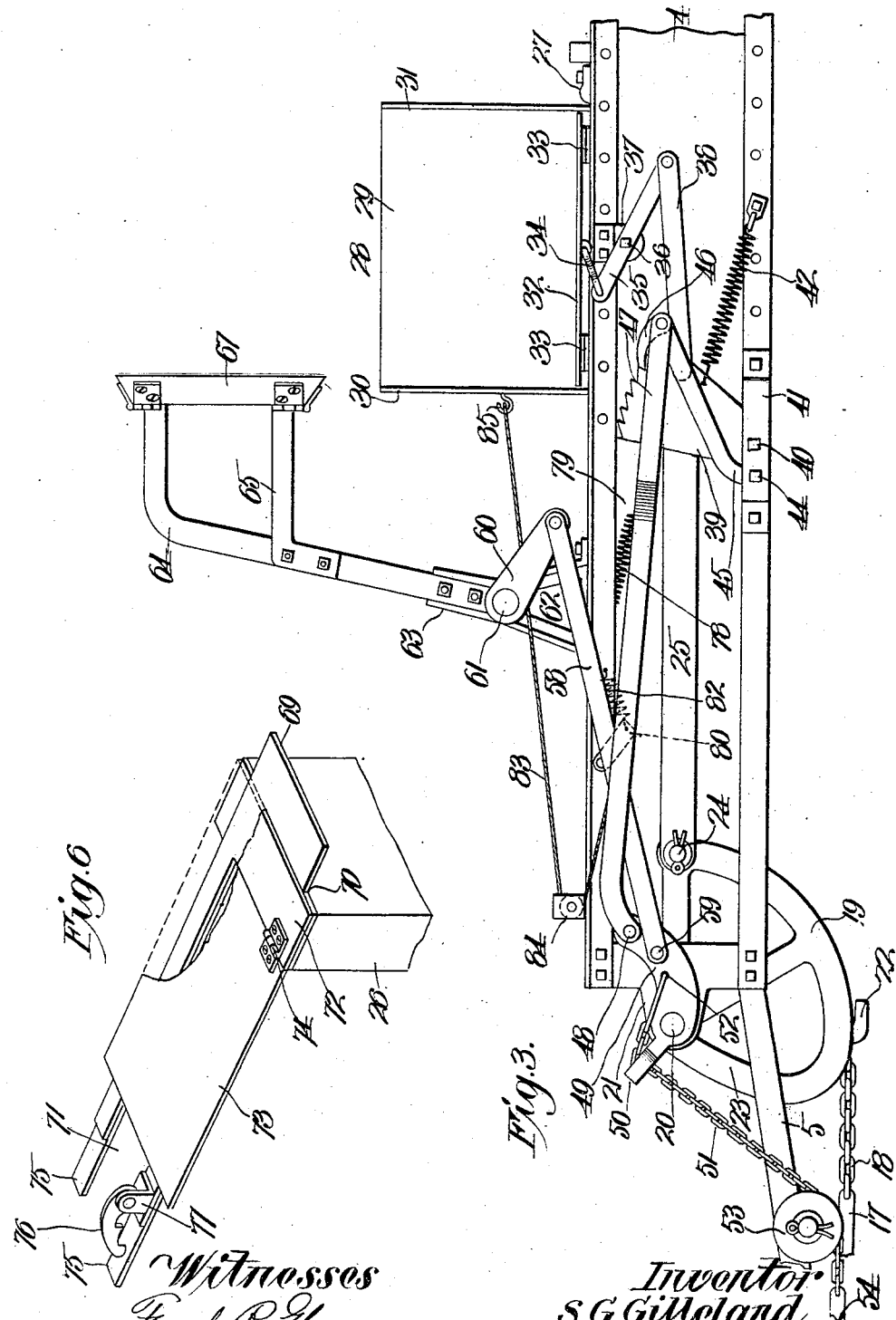
Witnesses
Frank R. Lon
H. C. Rodgers
Inventor
S. G. Gilleland
By George J. Thorpe Atty.

S. G. GILLELAND.
BALING PRESS.
APPLICATION FILED AUG. 5, 1909.
968,650.
Patented Aug. 30, 1910.
4 SHEETS—SHEET 3.
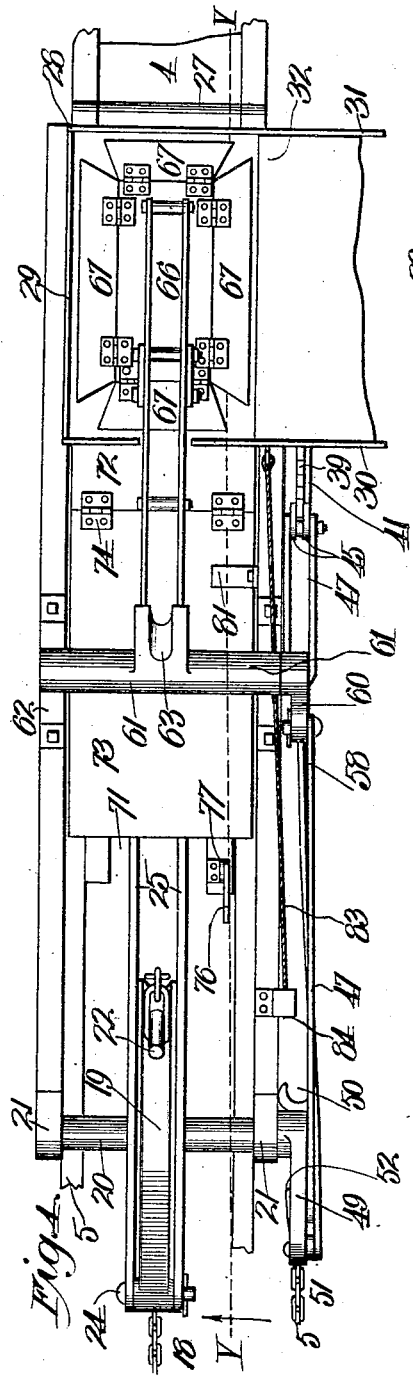
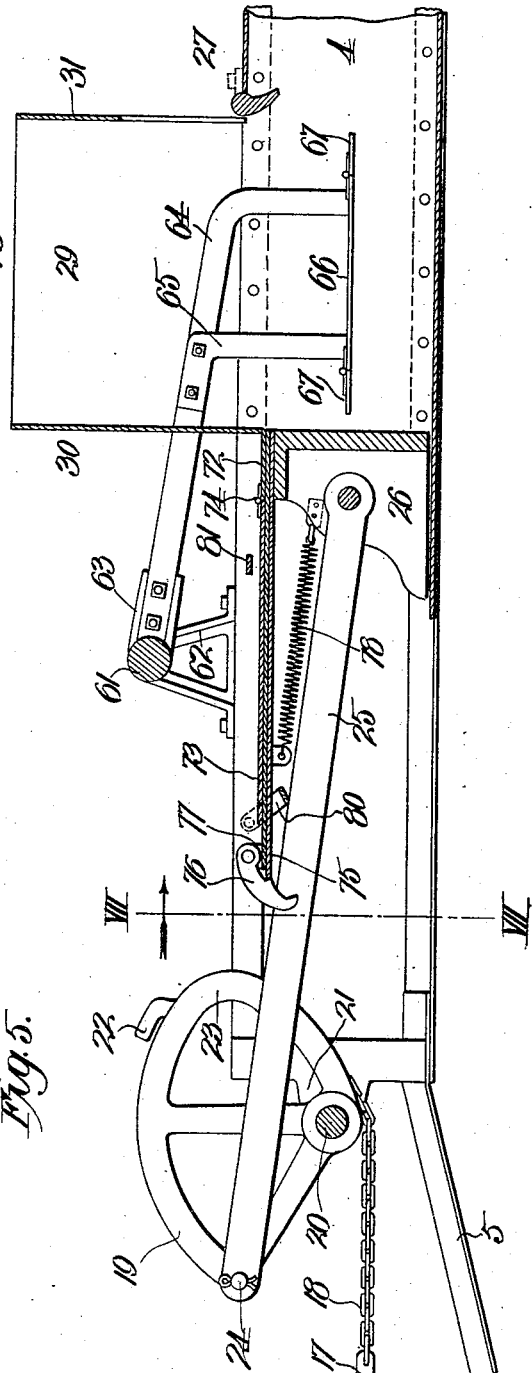
Witnesses
Frank R Elon
H. C. Rodgers.
Inventor
S. G. Gilleland
By George H Thorpe Atty.

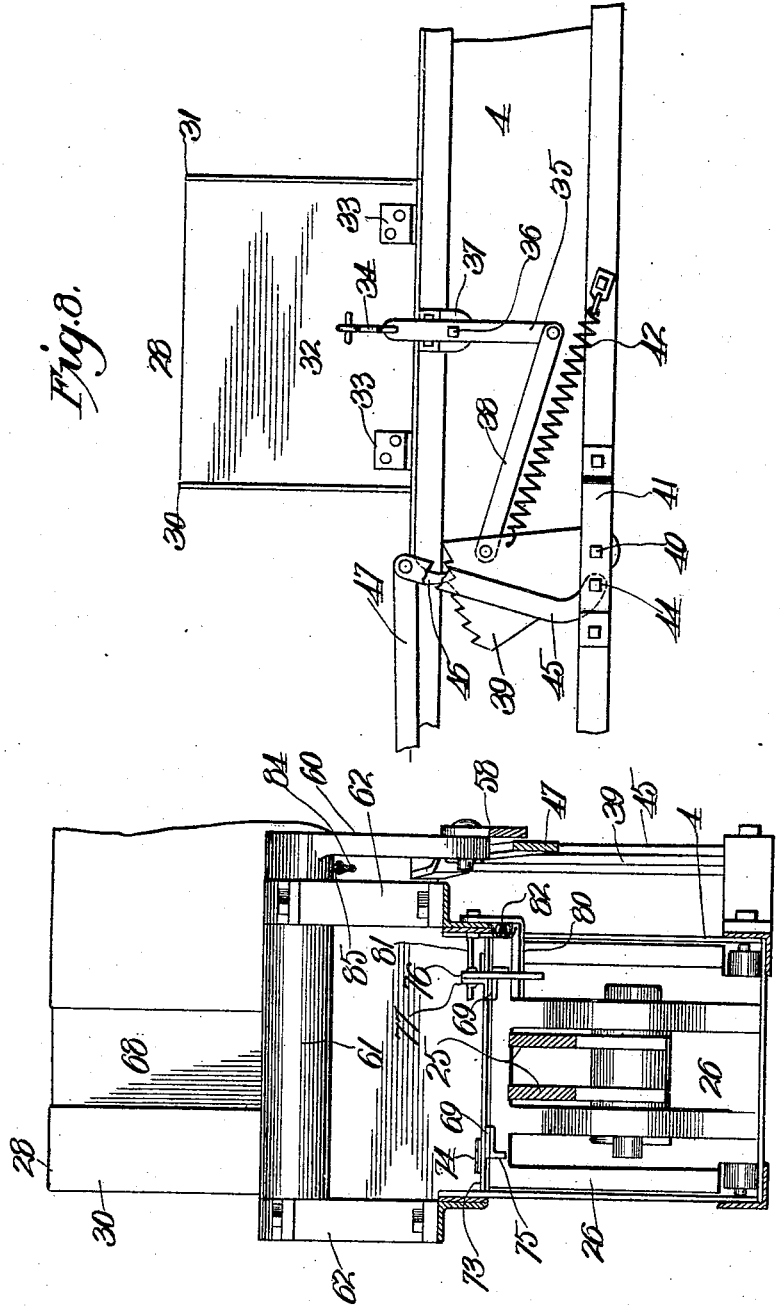

UNITED STATES PATENT OFFICE.

SAMUEL G. GILLELAND, OF KANSAS CITY, MISSOURI.

BALING-PRESS.

968,650.  Specification of Letters Patent.  Patented Aug. 30, 1910.

Application filed August 5, 1909. Serial No. 511,357.

*To all whom it may concern:*

Be it known that I, SAMUEL G. GILLELAND, a citizen of the United States, residing at Kansas City, in the county of Jackson and State of Missouri, have invented certain new and useful Improvements in Baling-Presses, of which the following is a specification.

This invention relates to baling presses and more especially to machines of this character provided with automatic feeders, my objects being to produce a simple power mechanism giving a power stroke divided into a quick and long condensing and a relatively slow and short compressing movement; means for preventing the baling material from bulging upward in the baling case as the plunger in its power stroke moves from the front to the rear end of the feed-opening; means whereby the feeder after its compression stroke, is freed from the baling material to guard against the re-elevation of such material in the withdrawal action of the feeder; and simple and efficient means for condensing baling material in the hopper preliminary to the descent of the feeder.

With these and other objects in view the invention consists in certain novel and peculiar features of construction and organization as hereinafter described and claimed; and in order that it may be fully understood reference is to be had to the accompanying drawings, in which;

Figure 1, is a top plan view of the power mechanism of a baling press embodying my invention. Fig. 2, is a side view of the same. Fig. 3, is a side view of the baling case end of the machine. Fig. 4, is a top plan view of the baling case end of the machine with the feeder depressed, and the plunger withdrawn. Fig. 5, is a section on the line V—V of Fig. 4. Fig. 6, is a detail perspective view of a part of the plunger, its apron and the means whereby the baling material is prevented from bulging upward through the feed-opening as the plunger makes its power stroke. Fig. 7, is an enlarged section on the line VII—VII of Fig. 5. Fig. 8, is a detail view of part of the mechanism for condensing the baling material in the hopper.

In the said drawings, 1 indicates a base-plate having a rearwardly-projecting portion 2 connected by angle-bars 3 to the baling case 4, the rear portions 5 of the bars 3 extending upwardly as shown in Figs. 3 and 5 in order that the base-plate may occupy a lower plane than the baling case, though this relation of parts is susceptible of variation. It is desirable however as making it possible for the draft animals employed to more easily step over the bars 3 in the operation of the sweep 6, the sweep-head 7 being journaled on the upper end of a stub-shaft 8 cast with or otherwise rigidly secured to and projecting upward from the base-plate 1, the said stub-shaft having an enlargement 9 upon which the sweep-head rests and being equipped with a nut 10 to hold the sweep firmly down upon the said enlargement, and said sweep is provided with a plurality of depending—preferably three—substantially V-shaped cam-lugs 11, the inner and outer faces of said cam-lugs being respectively numbered 12 and 13. Pivoted on the base-plate at 14 in front of the stub-shaft 8 is a swing-arm 15 equipped at its upper side with an antifriction roller 16 for successive engagement by the inner and outer faces of each cam-lug, and pivoted to the outer end of said swing-arm is a pull-rod 17, the pull-rod being adapted by preference, to operate in a horizontal plane between the swing-arm and said cam-lugs in order to avoid conflict therewith. The pull-rod 17 is connected at its rear end to a chain 18 trained upon a vertically arranged segment 19 secured rigidly on a shaft 20 journaled in bearings 21, the connection being made by fitting the chain over a hook 22 projecting peripherally from said segment. The portion 23 of the rotary segment with which the chain 18 is engaged is of cam-shape and gradually increases in distance from its inner to its outer end so that in the rotation of the cam from a position shown in Fig. 5 to the position shown in Fig. 3, the chain 18 effects such movement with a gradually decreasing speed and increasing power. Pivoted at 24 to the rotary segment and disposed at opposite sides of the same by preference are two bars 25 constituting the pitman or plunger-bar pivoted to the reciprocatory plunger 26 in the baling case, said plunger being adapted to move from the position shown in Fig. 5 to a point beyond the customary or any approved folder 27 depending into the baling chamber rearward of the hopper 28, said hopper preferably consisting of a permanent vertical side wall 29 and front and rear end walls 30 and 31 projecting beyond the opposite side of the baling case from wall 29; and the movable side wall 32 hinged at its lower edge at 33 to the adjacent corner of the baling case.

34 is a link pivotally connecting the hinged side wall of the hopper to a rock-bar 35 pivoted at 36 to a bracket 37 bolted to the adjacent side of the baling case, the opposite end of said rock-bar being pivotally connected by a link 38 to a vertical peripherally-notched rock-plate 39 pivoted on a bolt 40 carried by the adjacent side of the baling case and a bracket 41 secured to said side, the rock-plate 39 being held yieldingly at the rearward limit of its movement by a retractile spring 42 connected at one end to the rock-plate and at its opposite end to the adjacent side of the baling case as shown clearly in Fig. 3. Pivoted on a bolt 44 between the side of the baling case and bracket 41 and forward of the pivotal point of the rock-plate 39 is a swing-arm 45 equipped with a gravity or yieldingly-depressed pawl 46 normally engaging one of the notches of the rock-plate. Pivotally connected at its rear end to the free or pawl-carrying end of swing-arm 45 is a forked link 47, the opposite or front end of said link being pivoted at 48 to a crank-arm 49 of shaft 20, and said crank-arm is provided with a substantially radial fork lug 50 through which is trained a flexible connection or chain 51 pivotally connected at 52 to the crank-arm 49. Said chain is trained under a guide-sheave 53 carried by the inclined portions 5 of angle-bars 3. From said guide-sheave the chain extends forward a suitable distance and is connected to the rear end of a pull-rod 54 pivoted at its front end to the inner end of a horizontal rock-bar 55 fulcrumed on a stub-shaft 56 projecting upward from the base-plate, the outer end of said rock-bar being equipped with an antifriction roller 57 for successive engagement by the outer faces 13 of the depending cam-lugs 11 of the sweep-head.

58 is a link pivotally connected at its front end at 59 to crank-arm 49 inward of the pivotal connection with the latter of link 47 for a purpose which hereinafter appears, the opposite or rear end of link 58 being pivotally connected to the crank-arm 60 of a rock-shaft 61 journaled in brackets 62 secured rigidly upon the upper angle-bars of the baling case. Said shaft 61 is provided centrally with an arm 63 to which are bolted substantially right-angle-shaped bars 64, and projecting from said bars are arms 65, the free ends of the bars 64 and arms 65 carrying a foot or plate 66 provided with hinged marginal wings 67, the parts or elements 64, 65, 66 and 67 constituting a feeder adapted to swing down through the hopper into the baling chamber for the purpose of forcing a charge of baling material from the hopper down into the baling chamber, and to accommodate such movement of the feeder the front wall 30 of the hopper is provided with a vertical slot 68 (see Fig. 7), the extremes of movement of the feeder being indicated in Figs. 3 and 5.

For the purpose of preventing the baling material deposited in the baling chamber by the feeder, from bulging upward through the feed-opening while the plunger is moving from the plane of the front wall nearly to the plane of the rear wall of the hopper, I provide a slidable cut-off for projecting rearwardly beyond the plunger just above its upper side, and I also provide means for preventing sliding movement of the cut-off during one stroke of the plunger in order to give time for the insertion of a division block.

Referring now to the cut-off mechanism 69 is a slidable plate or cut-off mounted in a groove 70 in the upper edge of the plunger, said plate or cut-off for the greater part of its length being bifurcated as at 71 to accommodate the vertical play of the pitman 25.

72 is a plate bridging the cut-off to retain it in position and 73 is the customary apron hinged as at 74 to the plate 72.

75 indicates a pair of parallel bars projecting from the plunger and forming a support for the bifurcated portion of the cut-off and under certain conditions for the gravity-dog 76 pivoted to a bracket 77 carried by the bifurcated portion of the cut-off. Initially the gravity dog engages the rear end of the underlying bars 75 and thus holds the cut-off withdrawn with its front edge flush with the front face of the plunger, as shown in Fig. 5, a retractile spring 78 being secured at its front end to the cut-off and at its rear end to the plunger slidable on the baling case frame for the purpose of sliding the cut-off to the relative position shown in Fig. 6. As the plunger advances the depending portion of the dog is adapted to strike and be tripped from engagement with bar 75 by means of the angle bar 80 pivotally pendent from the adjacent angle bar of the baling case. As it is thus tripped the spring 78 retracts and slides the cut-off beyond the face of the plunger for the purpose of preventing the baling material under the pressure of the plunger from bulging up into the hopper during the baling operation. When the plunger has moved a sufficient distance to effect the closing of the bottom of the hopper by the cut-off and apron, the dog 76 comes into engagement with and is arrested by the stop bracket 81 rigid with the frame of the baling case, the movement of the plunger being uninterrupted by such arrest of the cut-off.

When the plunger attains the limit of such movement the bar 75 passes from under the dog 76 and the latter drops down and engages the rear end of said bar and thus locks the cut-off and plunger together. When the plunger withdraws it carries the cut-off with it, and the dog just before such withdrawal movement is completed strikes the angle bar 80 and swings it forward against the resistance of the spring 82 connecting it with the baling case frame. Eventually the dog rides over the said angle bar and then the latter is drawn back to its original position by the spring 82.

Assuming that sufficient material has been compressed to form a bale and it is desired to have sufficient time in which to insert a division block, not shown, into the baling case by way of the hopper, the angle bar 80 is swung forward to a vertical position to permit the dog to pass over it, by means of the pull cord 83 trained around a suitably supported sheave 84 and anchored at one end to the hopper as at 85 or at any suitable or fixed point. By means of this cord it is obvious that the compression action of the plunger may take place without the usual projection therefrom of the cut-off so as to give the operator more time in which to insert the division block as explained.

Assuming that the power mechanism is disposed substantially as shown in Figs. 1 and 5, it will be seen that one of the cam-lugs has just passed out of engagement with antifriction roller 57 and that the inner face 12 of another of the cam-lugs has just begun to engage antifriction roller 16 of swing-arm 15, the sweep turning in the direction indicated by the arrow, Fig. 1. In such movement the swing arm 15 is caused to move in the same direction at a more rapid rate than the sweep, the leverage increasing and the rate of speed decreasing as roller 16 mounts toward the apex of said cam-lug. By the time it clears such apex about three-fifths of the power stroke of the plunger and of the withdrawal stroke of the feeder has been made, it being obvious that the peculiarly shaped segment coöperates with the power mechanism in obtaining the effect described, the segment 19 in fact acting to compound the leverage of the power mechanism on the plunger in the power stroke of the same and the withdrawal movement of the feeder. After the roller 16 rides over the apex of the said cam-lug leverage is gained on the latter at a sacrifice of speed so that the remaining portion of the stroke of the plunger shall be slower but with greater power. As these movements are ended the roller 16 rides off the outer end of face 13 of said cam and almost immediately thereafter the third or formerly inoperative cam-lug, comes into engagement with roller 57 of rock bar 55 and through the connections described, swings the feeder downward and withdraws the plunger. At the end of the compression stroke of the plunger, the pawl 46 engages one of the rearmost notches of the notched segment 39 and is thus positioned to overcome the resistance of spring 42 and swing said segment forward as the feeder starts downward, it being noticed by reference to Fig. 3 that link 47 is pivoted to crank arm 49 a greater distance from its axis of rotation than is link 58 and that consequently link 47 will move more rapidly than link 58 and therefore more quickly operate the toggle constituted by the rock-bar 35 and link 38 for the purpose of swinging the hinged hopper-wall 32 from a horizontal to a vertical position to condense the charge of baling material placed in the hopper immediately after the feeder withdrew therefrom, before such charge is engaged by the descending feeder. By reason of the eccentricity of the pivotal points of segment 39 and the swing arm 45 carrying the pawl, the latter is disengaged from the said segment before the feeding stroke of the feeder is completed so as to permit the spring 42 to contract and swing said segment back to its original position and thereby contract the toggle and swing the hinged wall of the hopper back to its original position. Upon the next advance of the plunger link 47 is caused to dispose the swing arm 45 in the position shown in Fig. 3 to effect the reëngagement of pawl 46 with the notch of the segment 39, all subsequent operations being repetitions of those described.

From the above description it will be apparent that I have produced a baling press embodying the features of advantage enumerated as desirable and which is susceptible of modification in minor particulars without departing from the spirit and scope of the appended claims.

Having thus described the invention what I claim as new and desire to secure by Letters-Patent, is:

1. A baling press, comprising a base-plate and a baling case connected together, a hopper above and communicating with the baling case, a feeder to swing up and down in the baling case and through the hopper, a reciprocatory plunger in the baling case, a suitably-journaled segment connected to actuate the feeder and the plunger upward and rearward respectively at the same time and downward and forward respectively at the same time, a sweep horizontally rotatable above the base-plate, a plurality of cam-lugs rotatable with the sweep and having inner and outer faces bearing a V-shaped relation, a swing-arm pivoted to the base forward of the axis of the sweep to swing in a horizontal plane, a rock-bar arranged to operate horizontally above the base-plate, with its axis rearward and to one side of the axis of the sweep, suitable connections between the outer end and inner end respectively of said swing-arm and rock-bar and said segment, an antifriction roller carried by the swing-arm and adapted to be successively engaged by the inner and outer faces of each cam-lug, and an antifriction roller carried by the outer end of the rock-bar and adapted to be successively engaged by the outer faces of said cam-lug.

2. A baling press, comprising a base-plate, a baling chamber having a superposed communicating hopper and bearing a fixed relation to the base-plate, a horizontal sweep above and bearing a journaled relation to the base-plate, a swing-arm pivoted on the base-plate forward of the axis of the same, a vertically arranged rotatable segment, a pitman pivotally connecting the segment with the plunger, a flexible connection secured to the periphery of said segment and connected to the free or outer end of said swing-arm, and a roller and a substantially V-shaped cam-lug, one of such elements being carried by the swing-arm and the other by the sweep and so arranged that, as the latter rotates the roller will successively engage the inner and outer faces of the cam-lug to impart compression or rearward movement to the plunger at a gradually decreasing speed and increasing leverage.

3. A baling press, comprising a base-plate, a baling chamber having a superposed communicating hopper and bearing a fixed relation to the base-plate, a horizontal sweep above and bearing a journaled relation to the base-plate, a swing-arm pivoted on the base-plate forward of the axis of the same, a vertically arranged rotatable segment, a pitman pivotally connecting the segment with the plunger, a flexible connection secured to the periphery of said segment and connected to the free or outer end of said swing-arm, and a roller and a substantially V-shaped cam-lug, one of such elements being carried by the swing-arm and the other by the sweep and so arranged that as the latter rotates the roller will successively engage the inner and outer faces of the cam-lug to impart compression or rearward movement to the plunger at a gradually decreasing speed and increasing leverage, in combination with a feeder arranged to move in a vertical plane in and out of the baling case and through the hopper, means connecting the feeder with the segment, a rock-bar arranged to operate horizontally above the base-plate, means whereby the movement of the rock-bar in one direction shall turn the segment and effect downward movement of the feeder and forward movement of the plunger and opposite movement of the segment shall effect reverse movement of the rock-bar and upward movement of the feeder, and a cam and roller, one of said elements being rotatable with the sweep and the other with the outer end of the rock-bar and adapted for engagement to effect the first-named movement of said rock-bar.

4. A baling press, comprising a base-plate, a baling case bearing a fixed relation thereto, a reciprocatory plunger in the baling case, a vertically arranged segment bearing a fixed relation to the baling case, and having a cam end, a pitman pivotally connecting the opposite end of the segment with the plunger, a sweep pivoted to the base, a swing-arm pivoted to the base forward of the axis of the sweep, a flexible connection secured to the periphery of said segment and initially engaging its cam end and connected at its opposite end to the outer end of the said swing-arm, and a cam-lug of substantially V-shape and a shoulder, one of said elements being carried by the sweep and the other by the swing-arm and so arranged that, as the sweep swings forward the shoulder shall successively engage the inner and outer faces of the cam-lug to effect movement of the plunger at a gradually decreasing speed and increasing power.

5. A baling press, comprising a base-plate, a baling case bearing a fixed relation thereto, a reciprocatory plunger in the baling case, a vertically arranged segment bearing a fixed relation to the baling case, and having a cam end, a pitman pivotally connecting the opposite end of the segment with the plunger, a sweep pivoted to the base, a swing-arm pivoted to the base forward of the axis of the sweep, a flexible connection secured to the periphery of said segment and initially engaging its cam end and connected at its opposite end to the outer end of said swing-arm, and a cam-lug of substantially V-shape and a shoulder, one of said elements being carried by the sweep and the other by the swing-arm and so arranged that, as the sweep swings forward the shoulder shall successively engage the inner and outer faces of the cam-lug to effect movement of the plunger at a gradually decreasing speed and increasing power, and means actuated by the sweep for effecting reverse movement of the segment and the parts connected thereto.

6. In a baling press, a baling case having a feed-opening, a hopper communicating with the feed-opening and consisting of three stationary walls and one hinged wall capable of moving from a substantially horizontal to a substantially vertical position and vice versa, a substantially horizontal shaft suitably journaled and provided with a crank-arm, a toothed segment pivoted to the baling case adjacent to said hinged wall, a toggle connection between said segment and said hinged wall, one of the elements of the toggle being pivoted intermediate its ends to the baling case, yielding means for causing the segment to swing and effect opening or downward movement of said hinged wall, a swing-bar pivoted eccentrically of the segment, a pivoted pawl carried by the swing-bar and adapted for engagement with the notched segment, a link pivotally connecting said swing-bar with said crank-arm, and means for operating said shaft to swing the swing-bar forward and impart like movement to the segment to raise the hinged wall and eventually effect the disengagement of the pawl from the segment to permit the movement of the latter and the hinged wall to be reversed.

7. In a baling press, a baling case, a hopper communicating with the baling chamber of the case, a reciprocatory plunger in the baling case, a bar projecting forward from the plunger, a slidable cut-off mounted upon the plunger and said bar, yielding means tending to slide said cut-off to cause it to project beyond the rear face of the plunger, means movable with the cut-off and adapted at times to interlock the same with the plunger, and means for tripping the interlocking means to permit the cut-off to be projected beyond the rear face of the plunger.

8. In a baling press, a baling case, a hopper communicating with the baling chamber of the case, a reciprocatory plunger in the baling case, a bar projecting forward from the plunger, a slidable cut-off mounted upon the plunger and said bar, yielding means tending to slide said cut-off to cause it to project beyond the rear face of the plunger, means movable with the cut-off and adapted at times to interlock the same with the plunger, means for tripping the interlocking means to permit the cut-off to be projected beyond the rear face of the plunger, and means to arrest the cut-off while moving with said plunger before the compression stroke of the plunger is completed to effect the reinterlocking of the cut-off with the plunger without arresting the movement of the latter.

9. In a baling press, a baling case, a hopper communicating with the baling chamber of the case, a reciprocatory plunger in the baling case, a bar projecting forward from the plunger, a slidable cut-off mounted upon the plunger and said bar, yielding means tending to slide said cut-off to cause it to project beyond the rear face of the plunger, means movable with the cut-off and adapted at times to interlock the same with the plunger, means for tripping the interlocking means to permit the cut-off to be projected beyond the rear face of the plunger, means to arrest the cut-off while moving with said plunger before the compression stroke of the plunger is completed to effect the reinterlocking of the cut-off with the plunger without arresting the movement of the latter, and means for moving the said tripping means out of the path of the said interlocking means to prevent the projection of the cut-off beyond the rear face of the plunger.

10. In a baling press, a baling case, a hopper communicating with the baling chamber of the case, a reciprocatory plunger in the baling case, a bar projecting forward from the plunger, a slidable cut-off mounted upon the plunger and said bar, a retractile spring connecting the cut-off and the plunger and tending to project the former beyond the rear face of the latter, and a dog pivotally carried by the cut-off and engaging said bar to hold the cut-off in its withdrawn position and the said spring under tension.

11. In a baling press, a baling case, a hopper communicating with the baling chamber of the case, a reciprocatory plunger in the baling case, a bar projecting forward from the plunger, a slidable cut-off mounted upon the plunger and said bar, a dog pivoted to the cut-off and engaging the rear end of said bar and normally depending below the same, yielding means movable with the plunger and the cut-off and tending to project the latter beyond the rear face of the plunger, and a spring-retracted angle bar pivotally depending from the baling case in the path of rearward movement of the lower end of said dog to trip the latter from engagement with the bar projecting from the plunger to permit the cut-off to be projected by said yielding means beyond the rear face of the plunger.

12. In a baling press, a baling case, a hopper communicating with the baling chamber of the case, a reciprocatory plunger in the baling case, a bar projecting forward from the plunger, a slidable cut-off mounted upon the plunger and said bar, a dog pivoted to the cut-off and engaging the rear end of said bar and normally depending below the same, yielding means movable with the plunger and the cut-off and tending to project the latter beyond the rear face of the plunger, a spring-retracted angle bar pivotally depending from the baling case in the path of rearward movement of the lower end of said dog to trip the latter from engagement with the bar projecting from the plunger to permit the cut-off to be projected by said yielding means beyond the rear face of the plunger, and means to swing said angle bar out of the path of said dog to avoid the tripping of the latter.

13. In a baling press, a baling case, a hopper communicating with the baling chamber of the case, a reciprocatory plunger in the baling case, a bar projecting forward from the plunger, a slidable cut-off mounted upon the plunger and said bar, a dog pivoted to the cut-off and engaging the rear end of said bar and normally depending below the same, yielding means movable with the plunger and the cut-off and tending to project the latter beyond the rear face of the plunger, a spring-retracted angle bar pivotally depending from the baling case in the path of rearward movement of the lower end of said dog to trip the latter from engagement with the bar projecting from the plunger to permit the cut-off to be projected by said yielding means beyond the rear face of the plunger, means to swing said angle bar out of the path of said dog to avoid the tripping of the latter, and means rigid with the baling case for arresting the cut-off when projecting beyond the plunger without interrupting the movement of the latter, to effect the relative withdrawal of the cut-off to its original position with respect to the plunger and permit the dog to relock the cut-off in such withdrawn position.

In testimony whereof I affix my signature in the presence of two witnesses.

SAMUEL G. GILLELAND.

Witnesses:
H. C. RODGERS,
G. Y. THORPE.